(12) United States Patent
Sugaya

(10) Patent No.: US 9,019,539 B2
(45) Date of Patent: Apr. 28, 2015

(54) IMAGE DATA TRANSMISSION APPARATUS, IMAGE DATA TRANSMISSION METHOD, AND COMPUTER-READABLE STORAGE MEDIUM FOR COMPUTER PROGRAM CONFIGURED TO SEND IMAGE DATA TO A PLURALITY OF DESTINATIONS USING SEPARATE METHODS

(71) Applicant: Konica Minolta, Inc., Chiyoda-ku (JP)

(72) Inventor: Takashi Sugaya, Amagasaki (JP)

(73) Assignee: Konica Minolta, Inc., Chiyoda-Ku, Tokyo (JP)

( * ) Notice: Subject to any disclaimer, the term of this patent is extended or adjusted under 35 U.S.C. 154(b) by 0 days.

(21) Appl. No.: 14/017,083

(22) Filed: Sep. 3, 2013

(65) Prior Publication Data

US 2014/0063549 A1 Mar. 6, 2014

(30) Foreign Application Priority Data

Sep. 3, 2012 (JP) .................. 2012-193514

(51) Int. Cl.
*G06F 3/12* (2006.01)
*H04N 1/00* (2006.01)
(Continued)

(52) U.S. Cl.
CPC .......... *G06F 3/1296* (2013.01); *H04N 1/00973* (2013.01); *H04N 1/00225* (2013.01);
(Continued)

(58) Field of Classification Search
CPC .......... H04N 1/00255; H04N 1/00228; H04N 1/00233; H04N 1/00411; H04N 1/00474; H04N 1/00973; H04N 1/32534; H04N 1/4413; H04N 2201/0039; H04N 2201/0094; G06F 3/1296

USPC ........ 358/1.13, 1.15, 474, 402; 709/206, 223, 709/286

See application file for complete search history.

(56) References Cited

U.S. PATENT DOCUMENTS 6,801,340 B1 10/2004 Endo
7,480,707 B2 * 1/2009 Morlitz .......................... 709/223
(Continued)

FOREIGN PATENT DOCUMENTS

JP 08-088667 A 4/1996
JP 10-042068 A 2/1998
(Continued)

OTHER PUBLICATIONS

Office Action (Notification of Reason(s) for Refusal) issued on Aug. 26, 2014, by the Japan Patent Office in corresponding Japanese Patent Application No. 2012-193514, and an English Translation of the Office Action. (8 pages).

*Primary Examiner* — Gabriel Garcia

(74) *Attorney, Agent, or Firm* — Buchanan Ingersoll & Rooney PC

(57) ABSTRACT

An apparatus configured to execute a plurality of transmission tools is provided. The apparatus includes an option storing portion configured to store a plurality of options in each of which a destination to which image data is to be sent is associated with a tool identifier for identifying one of the transmission tools to be used to send the image data associated; a receiving portion configured to, when a user selects two or more options from among the options, receive a combination of the destination corresponding to each of the options selected and the transmission tool for the tool identifier corresponding to each of the options selected; and a transmission control portion configured to perform, for each of the combinations, a process for sending the image data to the destination corresponding to each of the combinations by using the transmission tool corresponding to each of the combinations.

27 Claims, 22 Drawing Sheets

(51) Int. Cl.
*H04N 1/32* (2006.01)
*H04N 1/44* (2006.01)
*G06F 15/00* (2006.01)

(52) U.S. Cl.
CPC ....... *H04N1/00228* (2013.01); *H04N 1/00233* (2013.01); *H04N 1/00411* (2013.01); *H04N 1/00474* (2013.01); *H04N 1/00482* (2013.01); *H04N 1/32534* (2013.01); *H04N 1/4413* (2013.01); *H04N 2201/0039* (2013.01); *H04N 2201/0094* (2013.01)

(56) References Cited

U.S. PATENT DOCUMENTS

| | | | |
|---|---|---|---|
| 7,761,591 B2 * | 7/2010 | Graham | 709/233 |
| 8,291,096 B2 * | 10/2012 | Stone et al. | 709/229 |
| 2002/0188645 A1 | 12/2002 | Uchikawa | |
| 2005/0021713 A1 * | 1/2005 | Dugan et al. | 709/223 |
| 2009/0021591 A1 | 1/2009 | Sako | |
| 2009/0116056 A1 | 5/2009 | Dokuni | |
| 2009/0119553 A1 | 5/2009 | Matsushima | |
| 2010/0002271 A1 | 1/2010 | Yamada | |
| 2011/0185027 A1 * | 7/2011 | Pearson et al. | 709/206 |

FOREIGN PATENT DOCUMENTS

| | | |
|---|---|---|
| JP | 11-215339 A | 8/1999 |
| JP | 2004-086731 A | 3/2004 |
| JP | 2004-172903 A | 6/2004 |
| JP | 2006-165622 A | 6/2006 |
| JP | 2008-193588 A | 8/2008 |
| JP | 2009-027333 A | 2/2009 |
| JP | 2009-118105 A | 5/2009 |
| JP | 2009-134695 A | 6/2009 |
| JP | 2010-015374 A | 1/2010 |

* cited by examiner

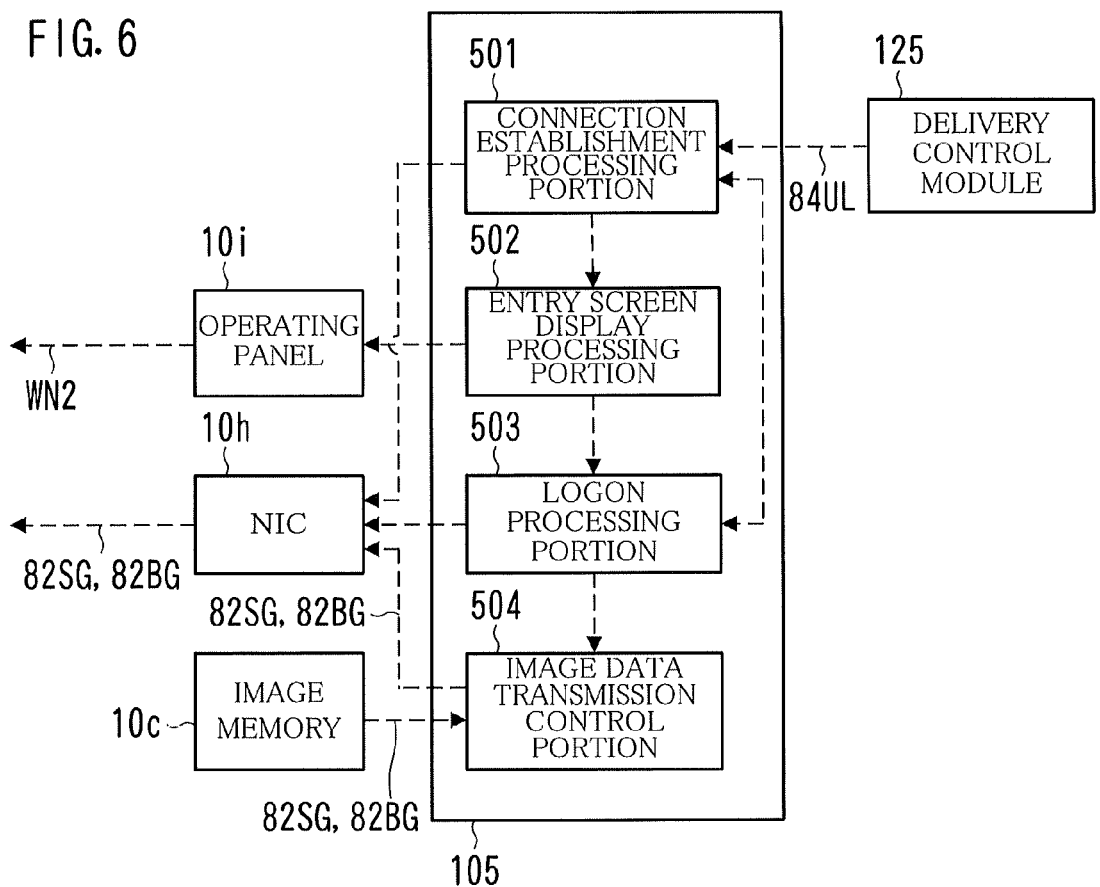

| SET CODE | REGISTERED NAME | HOST NAME | FILE PATH | USER CODE | PASSWORD | APPLICATION PATH |
|---|---|---|---|---|---|---|
| 001 | tanaka(A-COMPANY) | docs.aaa.example | /home/tanaka/ | tanaka | 123abc!"# | localhost/a/ |
| 002 | yamada(B-COMPANY) | develop.bbb.test | /doc/yamada/ | yamada | 999888zzz | localhost/b/ |
| 003 | takahashi(C-COMPANY) | www.ccc.example | /users/takahashi/ | takahashi | 987654# | localhost/c/ |
| 004 | tanaka(B-COMPANY) | develop.bbb.test | /doc/tanaka/ | tanaka | 111222### | localhost/b/ |
| 005 | suzuki(A-COMPANY) | docs.aaa.example | /home/suzuki/ | suzuki | mmmzzz# | localhost/a/ |
| 006 | guest(C-COMPANY) | www.ccc.example | ... | ... | ... | localhost/c/ |
| ... | ... | ... | ... | ... | ... | ... |

ENTER INFORMATION FOR LOG-ON

2010/06/21 12:34
AVAILABLE MEMORY 100%

C M Y K

USER CODE :

PASSWORD :

FOR SCAN_TO_E-MAIL AND BOX_TO_E-MAIL

| SET CODE | REGISTERED NAME | E-MAIL ADDRESS |
|---|---|---|
| 101 | Sato(E-Mail) | sato@mail.xxx.example |
| 102 | Matsuno(E-Mail) | matsuno@yyy.test |
| 103 | Nakamura(E-Mail) | nakamura@zzz.example |
| ⋮ | ⋮ | ⋮ |

FIG. 22

FOR UPLOAD APPLICATION 105A

| SET CODE | REGISTERED NAME | HOST NAME | FILE PATH | USER CODE | PASSWORD |
|---|---|---|---|---|---|
| 001 | tanaka (A-COMPANY) | docs.aaa.example | /home/tanaka/ | tanaka | 123abc!"# |
| 005 | suzuki (A-COMPANY) | docs.aaa.example | /home/suzuki/ | suzuki | mmmzzz# |
| ... | ... | ... | ... | ... | ... |

IMAGE DATA TRANSMISSION APPARATUS, IMAGE DATA TRANSMISSION METHOD, AND COMPUTER-READABLE STORAGE MEDIUM FOR COMPUTER PROGRAM CONFIGURED TO SEND IMAGE DATA TO A PLURALITY OF DESTINATIONS USING SEPARATE METHODS

This application is based on Japanese patent application No. 2012-193514 filed on Sep. 3, 2012, the contents of which are hereby incorporated by reference.

BACKGROUND OF THE INVENTION

1. Field of the Invention

The present invention relates to an apparatus and method for transmitting image data to a plurality of destinations, and so on.

2. Description of the Related Art

Recent years have seen the widespread use of image forming apparatuses having various functions such as copying, PC printing, scanning, faxing, and document server function. Such image forming apparatuses are sometimes called "multifunction devices", "Multi-Functional Peripherals (MFPs)", or the like.

Such a recent image forming apparatus is also configured to send image data of a scanned image to another device by means other than fax. For example, the image data is attached to an e-mail message and the resultant is transmitted, or, the image data is uploaded to a server. Further, many business entities have recently managed servers. How to upload image data to such servers sometimes differ among servers. In view of this, some image forming apparatuses are provided with upload applications on a server basis.

The following methods are proposed as a method for sending one common set of image data to a plurality of destinations.

In one method, a drawn image data storage section stores therein drawn image data produced by using an application. The drawn image data is transmitted to an MFP together with a job ID, and the MFP stores the drawn image data and the job ID into a drawn image data storage section. Thereafter, the MFP sequentially faxes the data to recorded destinations based on destination information recorded in a destination information list. During the fax transmission, information on the transmission result is sent to a host computer, the transmission state is conveyed to a status monitor, and the host computer keeps track of the transmission state to perform management and processing of facsimile transmission (see Japanese Laid-open Patent Publication No. 2006-165622).

In another method, a scanner/network connector for connecting a scanner to a network is provided with an LCD display unit and a touch panel by means of which a plurality of destination addresses is entered. A selection screen for the destination addresses is sent from a scanner controlling PC, and the user selects one of the destination addresses. The result of selection is conveyed to the scanner controlling PC and stored therein. When reading an original document is started, read image data is outputted to the scanner controlling PC. An application running on the scanner controlling PC transmits the received image data to the destination address previously stored (see Japanese Laid-open Patent Publication No. 2004-172903).

As described above, image forming apparatuses are configured to have many applied functions. This is because application software can be developed more simply than is conventionally possible. On the other hand, the simple development probably causes application software having problems with security to be available in the market. To cope with this, there is proposed a technology for increasing the robustness of environment under which application software is executed (see Japanese Laid-open Patent Publication No. 2009-134695).

Without the use of the methods described in Japanese Laid-open Patent Publication Nos. 2006-165622 and 2004-172903, it is troublesome for a user to send one set of image data to a plurality of destinations. To be specific, if the methods are not used, the user is required to repeat a series of operation a plurality of times corresponding to the number of destinations. The series of operation is: designating image data obtained by reading an image with a scanner, or, designating stored image data (Step S1); selecting one from among the plurality of destinations (Step S2); and entering an execution command (Step S3).

In contrast, when the methods described in Japanese Laid-open Patent Publication Nos. 2006-165622 and 2004-172903 are used, the user is able to select a plurality of destinations at one time after Step S1. When the user enters an execution command, the device sends image data to the selected destinations one by one.

However, it is impossible to use the conventional methods in order to send image data to the plurality of destinations by using separate methods. Stated differently, in order to do so, repeated operation of steps similar to the ones of Step S1 through Step S3 is required. In addition, operation to select a transmission method is also required before Step S2.

SUMMARY

The present invention has been achieved in light of such an issue, and an object thereof is to simplify operation to send image data to a plurality of destinations by using separate methods.

An image data transmission apparatus according to an aspect of the present invention is an image data transmission apparatus configured to execute a plurality of transmission tools sequentially or simultaneously, each of the transmission tools being to send data. The image data transmission apparatus includes an option storing portion configured to store a plurality of options in each of which a destination to which transmission target image data is to be sent is associated with a tool identifier for identifying one of the transmission tools to be used to send the transmission target image data associated; a receiving portion configured to, when a user selects two or more options from among the options, receive a combination of the destination corresponding to each of the options selected and the transmission tool for the tool identifier corresponding to each of the options selected; a writing portion configured to store the transmission target image data into an image data storage portion; and a transmission control portion configured to, after the receiving portion receives the combinations, perform, for each of the combinations, a process for sending the transmission target image data stored in the image data storage portion to the destination corresponding to said each of the combinations by using the transmission tool corresponding to said each of the combinations.

These and other characteristics and objects of the present invention will become more apparent by the following descriptions of preferred embodiments with reference to drawings.

BRIEF DESCRIPTION OF THE DRAWINGS

FIG. 6 is a diagram showing an example of the functional configuration implemented by an upload application.

FIG. 7 is a diagram showing an example of setting data.

FIG. 17 is a diagram showing an example of an entry screen.

FIG. 21 is a diagram showing an example of a list of e-mail addresses and registered names.

FIG. 22 is a diagram showing an example of an application database corresponding to an upload application.

DESCRIPTION OF THE PREFERRED EMBODIMENTS

Figure 1:
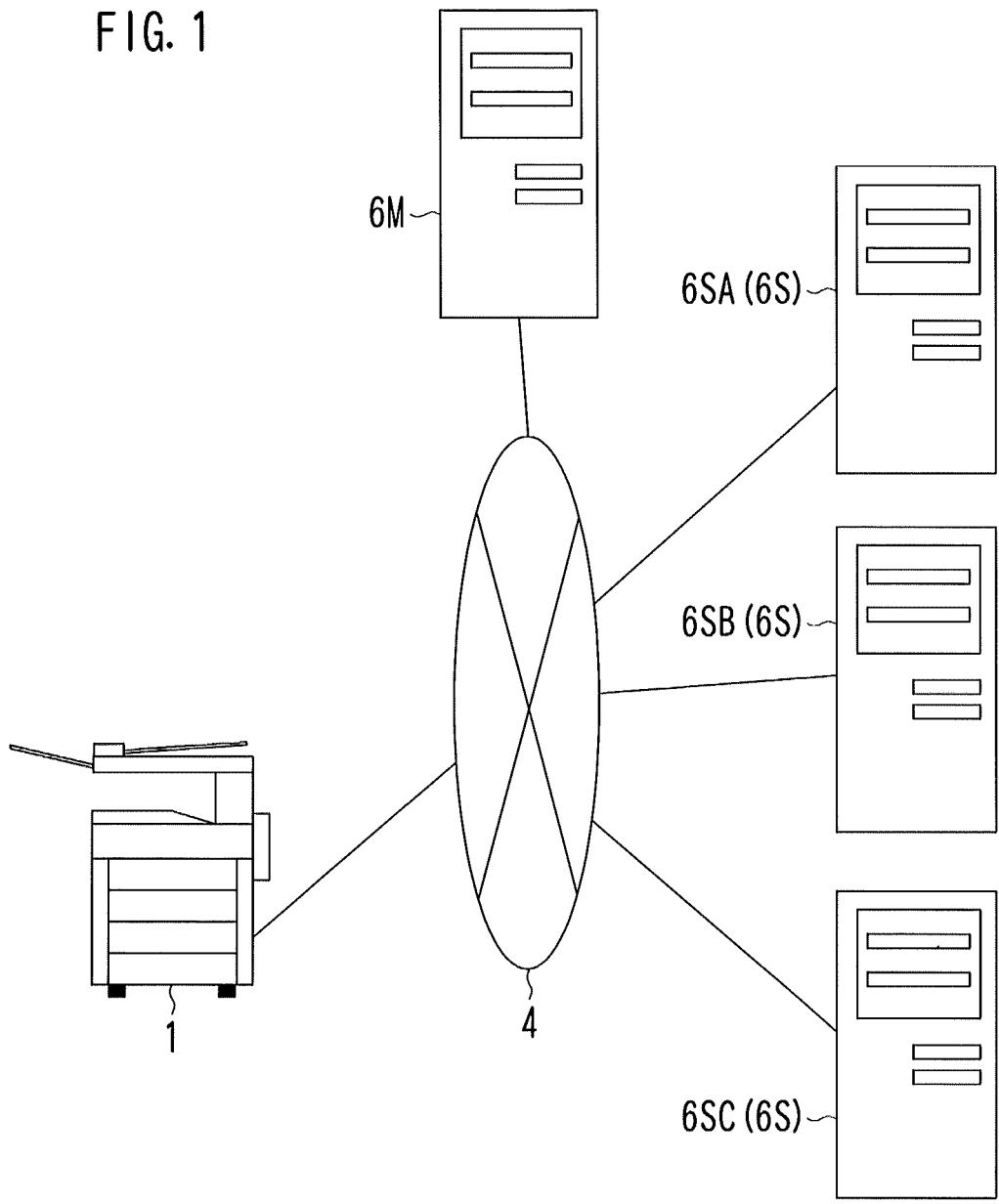
FIG. 1 is a diagram showing an example of the overall configuration of a network system including an image forming apparatus.
Figure 2:
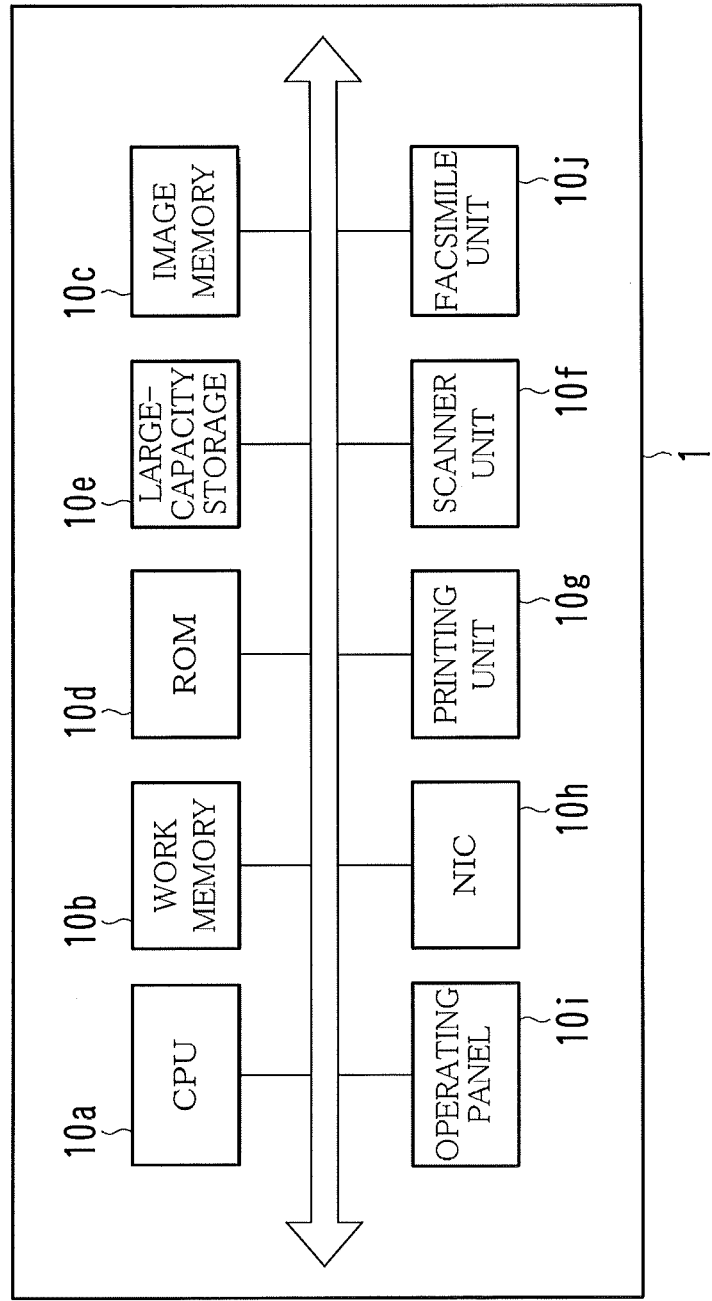
FIG. 2 is a diagram showing an example of the hardware configuration of an image forming apparatus.
Figure 3:
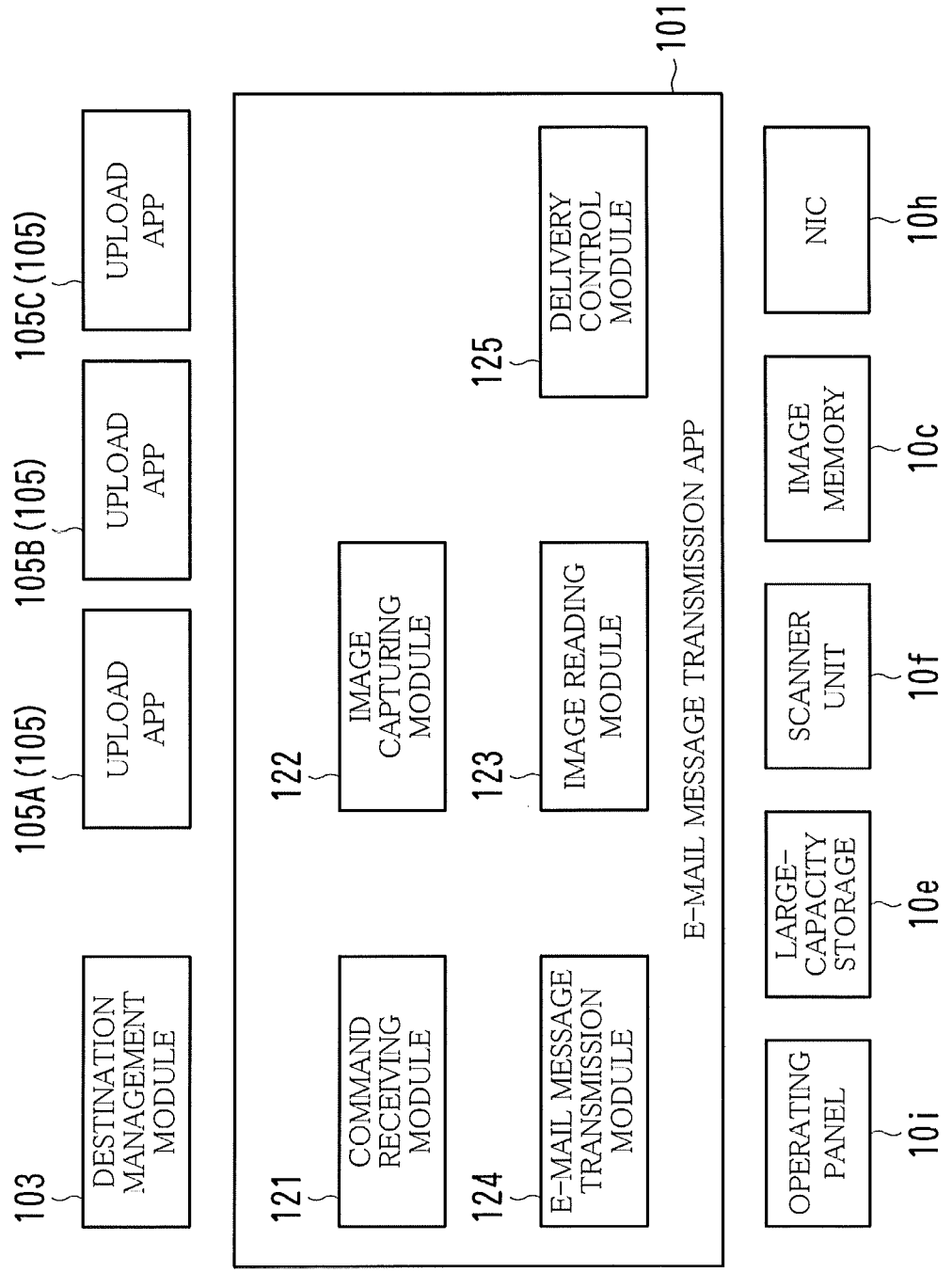
FIG. 3 is a diagram showing an example of a platform, in an image forming apparatus, for transmission of image data.
Figure 4:
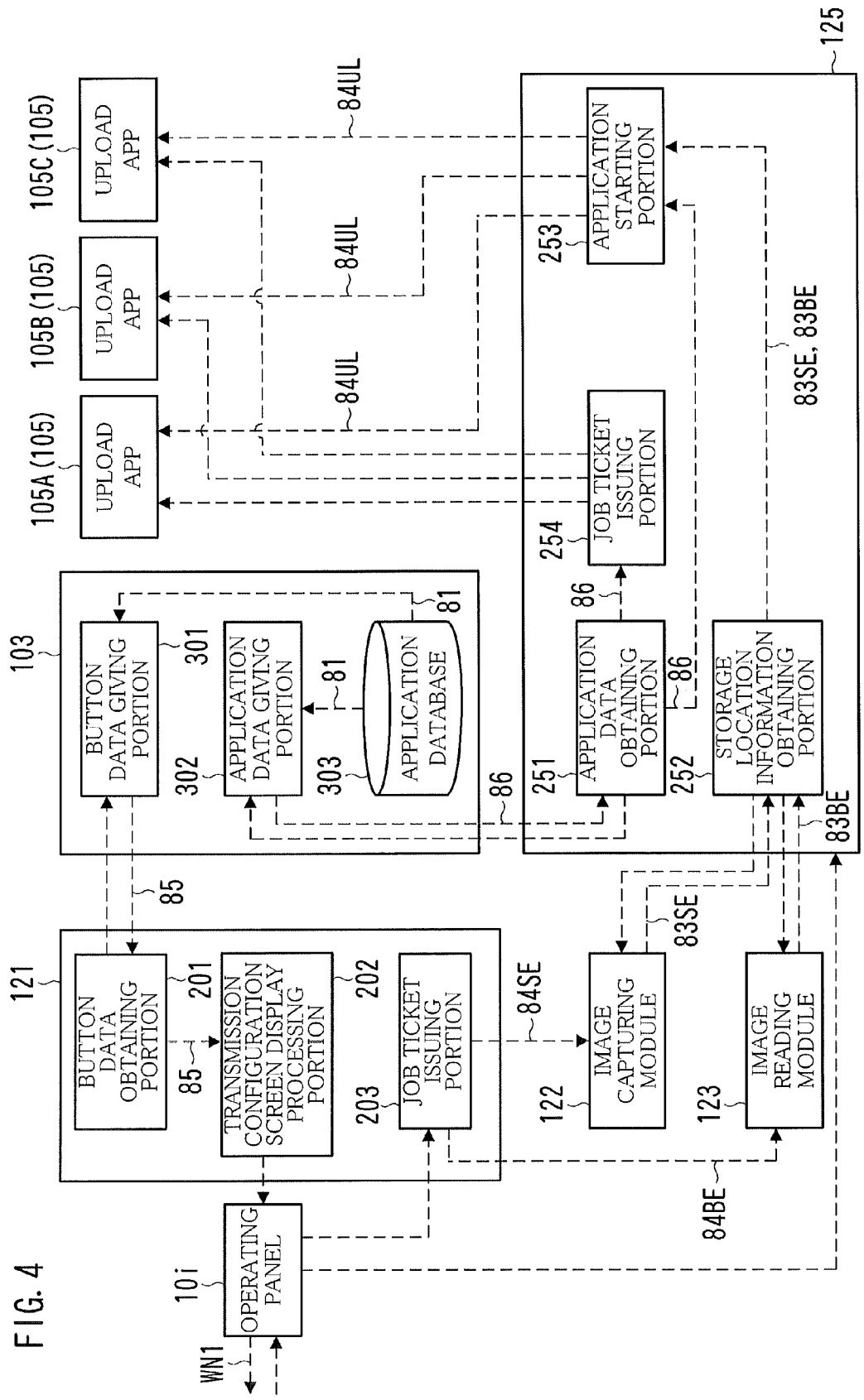
FIG. 4 is a diagram showing an example of the functional configurations implemented by a destination management module, a command receiving module, and a delivery control module.
Figure 5:
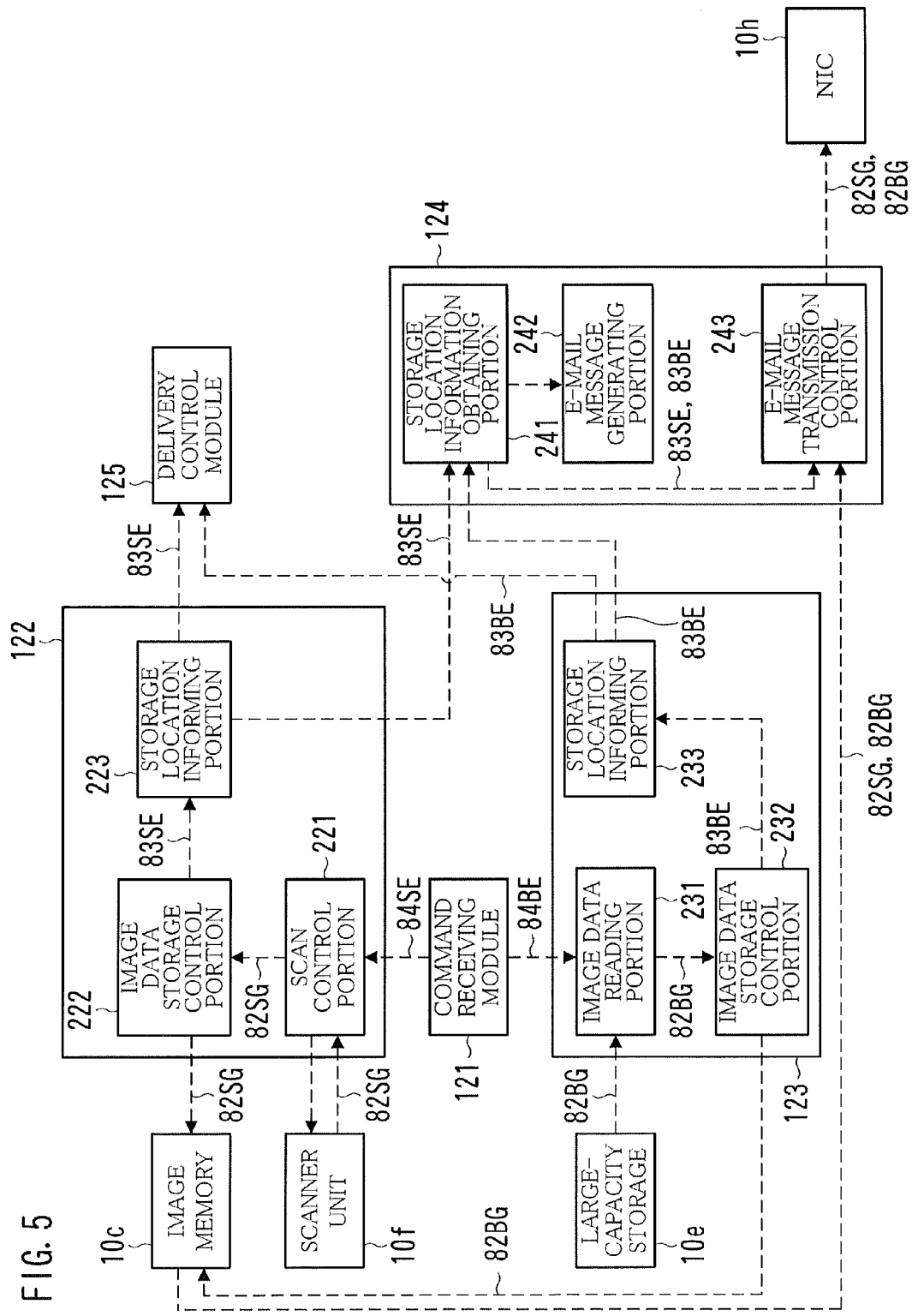
FIG. 5 is a diagram showing an example of the functional configurations implemented by an image capturing module, an image reading module, and an e-mail message transmission module.

FIG. 1 is a diagram showing an example of the overall configuration of a network system including an image forming apparatus 1; FIG. 2 is a diagram showing an example of the hardware configuration of the image forming apparatus 1; FIG. 3 is a diagram showing an example of a platform, in the image forming apparatus 1, for transmission of image data; FIG. 4 is a diagram showing an example of the functional configurations implemented by a destination management module 103, a command receiving module 121, and a delivery control module 125; FIG. 5 is a diagram showing an example of the functional configurations implemented by an image capturing module 122, an image reading module 123, and an e-mail message transmission module 124; and FIG. 6 is a diagram showing an example of the functional configuration implemented by an upload application 105.

Referring to FIG. 1, the image forming apparatus 1 is configured to perform communication with an electronic mail server 6M and a plurality of document servers 6S via a communication line 4. Examples of the communication line 4 are a Local Area Network (LAN), a dedicated line, and a public line.

The image forming apparatus 1 is an apparatus that is generally called a "Multi-Functional Peripheral (MFP)" or a "multifunction device". The image forming apparatus 1 is an apparatus into which functions such as copying, PC printing, faxing, scanning, and box function are consolidated.

The PC print function is a function to print an image onto paper based on image data received from a terminal such as a personal computer. The PC print function is sometimes called a "network printer function" or "network printing function".

The box function is a function in which a storage area called a "personal box" or "box" is allocated to each user. The box function enables each user to save image data to his/her storage area and to manage the image data therein. The box corresponds to a "folder" or "directory" in a personal computer.

The electronic mail server 6M serves to manage e-mail accounts, outboxes, inboxes, and so on for each user of the image forming apparatus 1. In this embodiment, the electronic mail server 6M is used, in particular, to transfer an e-mail message sent by the image forming apparatus 1 to another electronic mail server in accordance with Simple Mail Transfer Protocol (SMTP).

The document server 6S manages data on document such as text, chart, photograph, or illustration. As with the box function of the image forming apparatus 1, the document server 6S has storage areas on a user-by-user basis. A user is able to save data to his/her storage area, to read out data therefrom, to update data saved therein, and delete data saved therein.

Such a service is usually called a "document management service". As the document management service, Evernote developed by Evernote Corporation, Google Docs developed by Google Inc., and SharePoint developed by Microsoft Corporation achieve widespread use.

Referring to FIG. 2, the image forming apparatus 1 is configured of a Central Processing Unit (CPU) 10a, a work memory 10b, an image memory 10c, a Read Only Memory (ROM) 10d, a large-capacity storage 10e, a scanner unit 10f, a printing unit 10g, a Network Interface Card (NIC) 10h, an operating panel 10i, a facsimile unit 10j, a variety of types of control circuits, and so on.

The NIC 10h performs communication with the electronic mail server 6M and the document servers 6S in accordance with a protocol such as Transmission Control Protocol/Internet Protocol (TCP/IP).

The operating panel 10i is configured of a key entry portion, a touch-sensitive panel display, and so on. The key entry portion is a so-called hardware keyboard, and includes a numeric keypad, a start key, a stop key, and a function key. The touch-sensitive panel display displays, for example, a screen for presenting messages or instructions to a user, a screen for allowing a user to input desired processing types and conditions, and a screen showing the results of processing performed by the CPU 10a. A user operates the key entry portion or the touch-sensitive panel display while viewing the screens, which allows the user to enter information and commands to the image forming apparatus 1.

The scanner unit 10f reads out an image recorded on a sheet of paper placed on a document glass, and generates image data thereof.

The facsimile unit 10j sends and receives image data with a facsimile terminal via a public telephone line in accordance with a protocol such as G3.

The printing unit 10g prints, onto paper, an image read out by the scanner unit 10f, and an image shown in image data sent by a personal computer or a facsimile terminal.

The work memory 10b loads a program to be executed thereinto. The image memory 10c stores, thereinto, image data of the image read out by the scanner unit 10f and so on temporarily.

The ROM 10d or the large-capacity storage 10e stores, therein, an e-mail message transmission application 101, the destination management module 103, a plurality of the upload applications 105, and so on, all of which are shown in FIG. 3. The large-capacity storage 10e is, for example, a Hard Disk Drive (HDD) or a Solid State Drive (SSD).

The applications and modules are loaded into the work memory 10b as necessary, and are executed by the CPU 10a.

The e-mail message transmission application 101 is used to attach the image data of the image read out by the scanner unit 10f to an e-mail message and to send the resultant to a designated e-mail address. Such a service for attaching image data of an image read out to an e-mail message and sending the resultant is sometimes called a "Scan_To_E-Mail" service. The e-mail message transmission application 101 enables another service for attaching image data saved in a box to an e-mail message and sending the resultant. The service is generally called a "Box_To_E-Mail" service.

The e-mail message transmission application 101 is so extended that image data to be attached to an e-mail message and to be sent can be uploaded to the document server 6S.

The destination management module 103 is a software module for managing information on destinations for the case where the image data is uploaded to the document server 6S.

The individual upload applications 105 are applications (tools) to perform processing of uploading image data to the document servers 6S in accordance with a protocol such as a Hypertext Transfer Protocol (HTTP) or a File Transfer Protocol (FTP). This kind of application for personal computer and smartphone is usually distributed to users thereof by service providers.

This kind of application can be created based on an Application Program Interface (API) publicized by a service provider. The upload applications 105 are also created based on the API in a manner to be compatible with the image forming apparatus 1.

Hereinafter, processing by the e-mail message transmission application 101, the destination management module 103, and the upload applications 105 is described by taking an example in which three companies of A-company, B-company, and C-company provide document data management services separately. The document servers 6S run by the A-company, the B-company, and the C-company may be described separately as a "document server 6SA", a "document server 6SB", and a "document server 6SC", respectively. Further, the upload applications 105 by using which data is uploaded to the document server 6SA, the document server 6SB, and the document server 6SC may be described separately as an "upload application 105A", an "upload application 105B", and an "upload application 105C", respectively.

The e-mail message transmission application 101 is configured of the command receiving module 121, the image capturing module 122, the image reading module 123, the e-mail message transmission module 124, the delivery control module 125, and so on.

The modules from the command receiving module 121 through the e-mail message transmission module 124 are to execute a Scan_To_E-Mail job and a Box_To_E-Mail job. The delivery control module 125 is used for a program extension of uploading image data to the document server 6S.

The command receiving module 121 implements the functions of a button data obtaining portion 201, a transmission configuration screen display processing portion 202, a job ticket issuing portion 203, and so on, all of which are shown in FIG. 4. The individual portions are operable to receive, from a user, a command to execute a Scan_To_E-Mail job or a Box_To_E-Mail job. The specific steps for the processing are discussed later.

The image capturing module 122 implements the functions of a scan control portion 221, an image data storage control portion 222, a storage location informing portion 223, and so on, all of which are shown in FIG. 5. The individual portions are operable to generate image data of an image recorded on paper, and store the generated image data temporarily into the image memory 10c. The specific steps for the processing are discussed later.

The image reading module 123 implements the functions of an image data reading portion 231, an image data storage control portion 232, a storage location informing portion 233, and so on, all of which are shown in FIG. 5. The individual portions are operable to read out image data saved in a box, and store the read image data temporarily into the image memory 10c. The specific steps for the processing are discussed later.

The e-mail message transmission module 124 implements the functions of a storage location information obtaining portion 241, an e-mail message generating portion 242, an e-mail message transmission control portion 243, and so on, all of which are shown in FIG. 5. The individual portions are operable to attach image data stored into the image memory 10c to an e-mail message and to send the resultant. The specific steps for the processing are discussed later.

The delivery control module 125 implements the functions of an application data obtaining portion 251, a storage location information obtaining portion 252, an application starting portion 253, a job ticket issuing portion 254, and so on, all of which are shown in FIG. 4. The individual portions are operable to deliver, to the upload applications 105, information on the image data that has been sent through a Scan_To_E-Mail job or a Box_To_E-Mail job. The specific steps for the processing are discussed later.

The destination management module 103 implements the functions of a button data giving portion 301, an application data giving portion 302, an application database 303, and so on, all of which are shown in FIG. 4. The individual portions are operable to manage information on upload destinations of image data and to provide other modules with such information. The specific steps for the processing are discussed later.

The upload application 105 implements the functions of a connection establishment processing portion 501, an entry screen display processing portion 502, a logon processing portion 503, an image data transmission control portion 504, and so on, all of which are shown in FIG. 6. As described earlier, the upload application 105 is software to upload image data to the document server 6S. The specific steps for the processing are discussed later.

Figure 8:
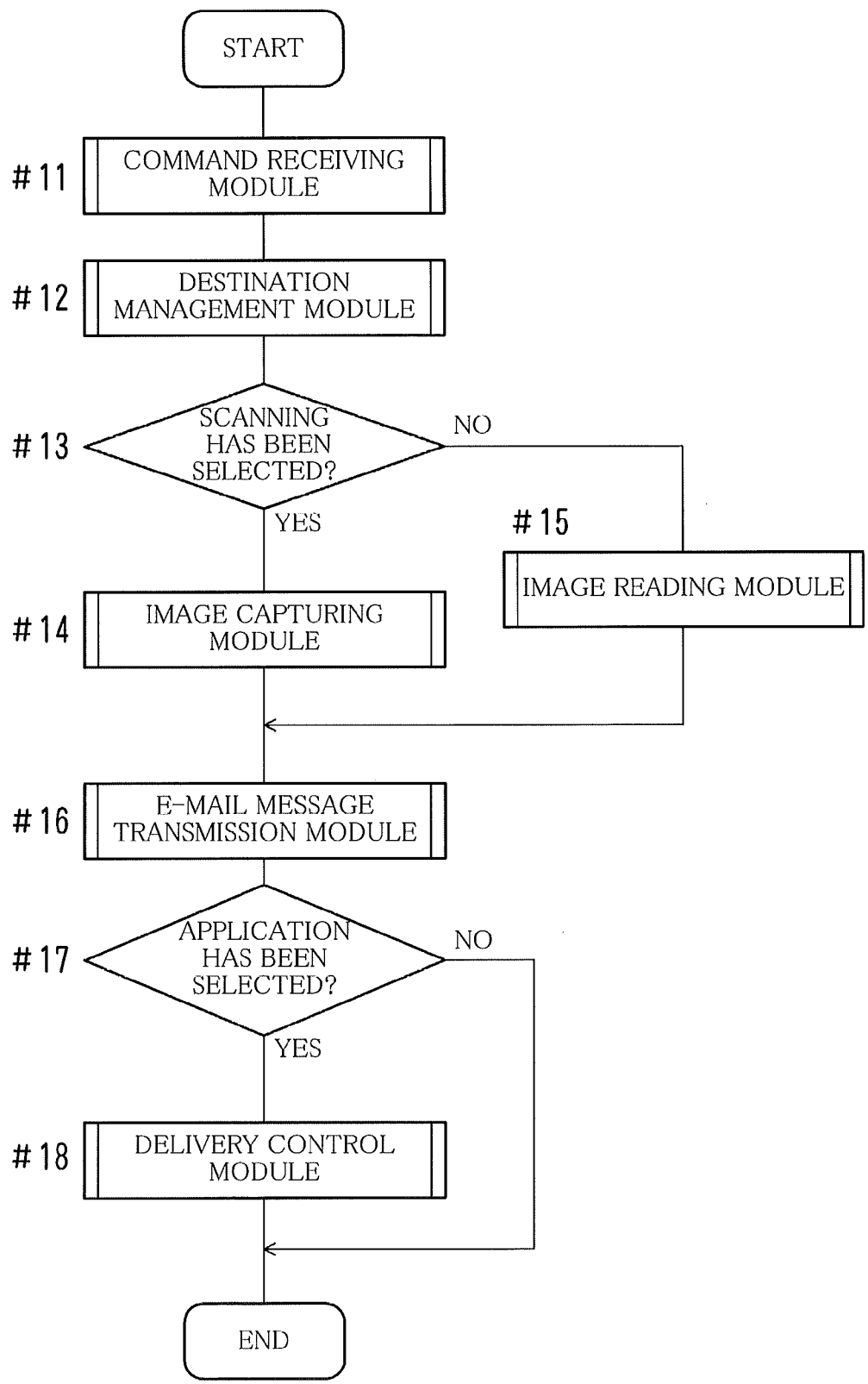
FIG. 8 is a flowchart depicting an example of the flow of the overall processing performed by an image forming apparatus.
Figure 9:
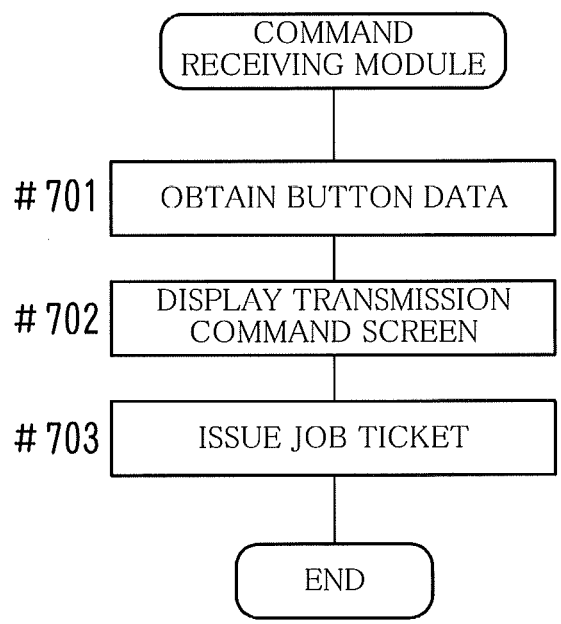
FIG. 9 is a flowchart depicting an example of the flow of processing based on a command receiving module.
Figure 10:
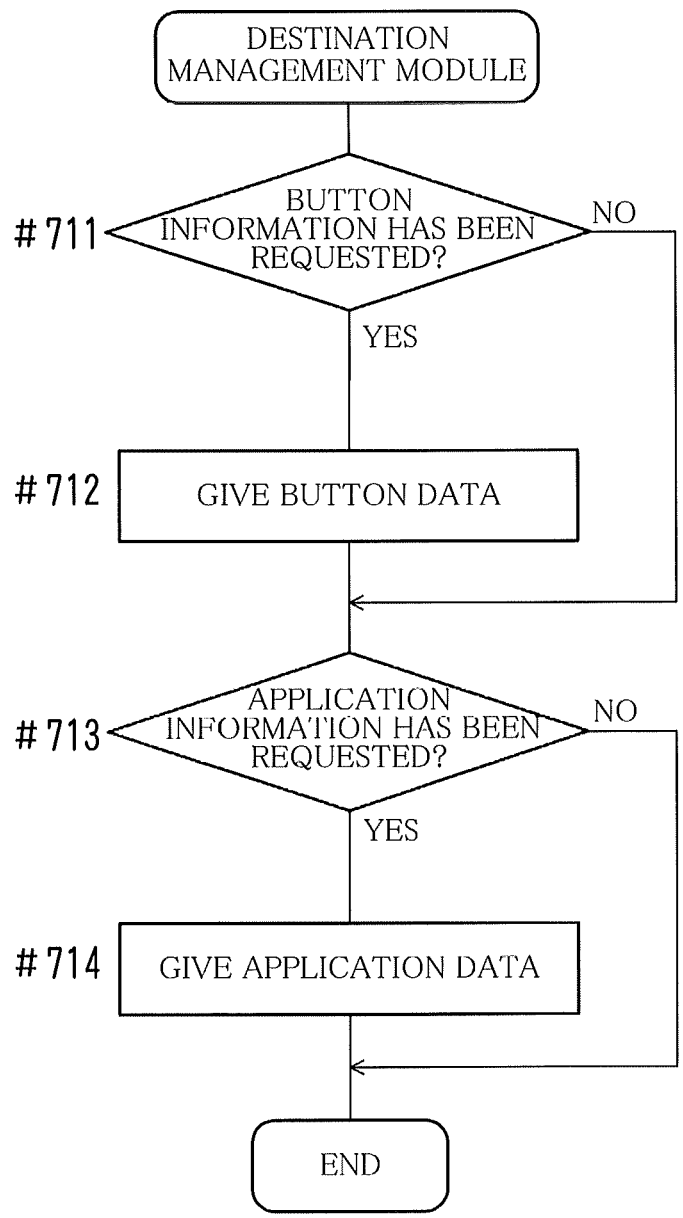
FIG. 10 is a flowchart depicting an example of the flow of processing based on a destination management module.
Figure 11:
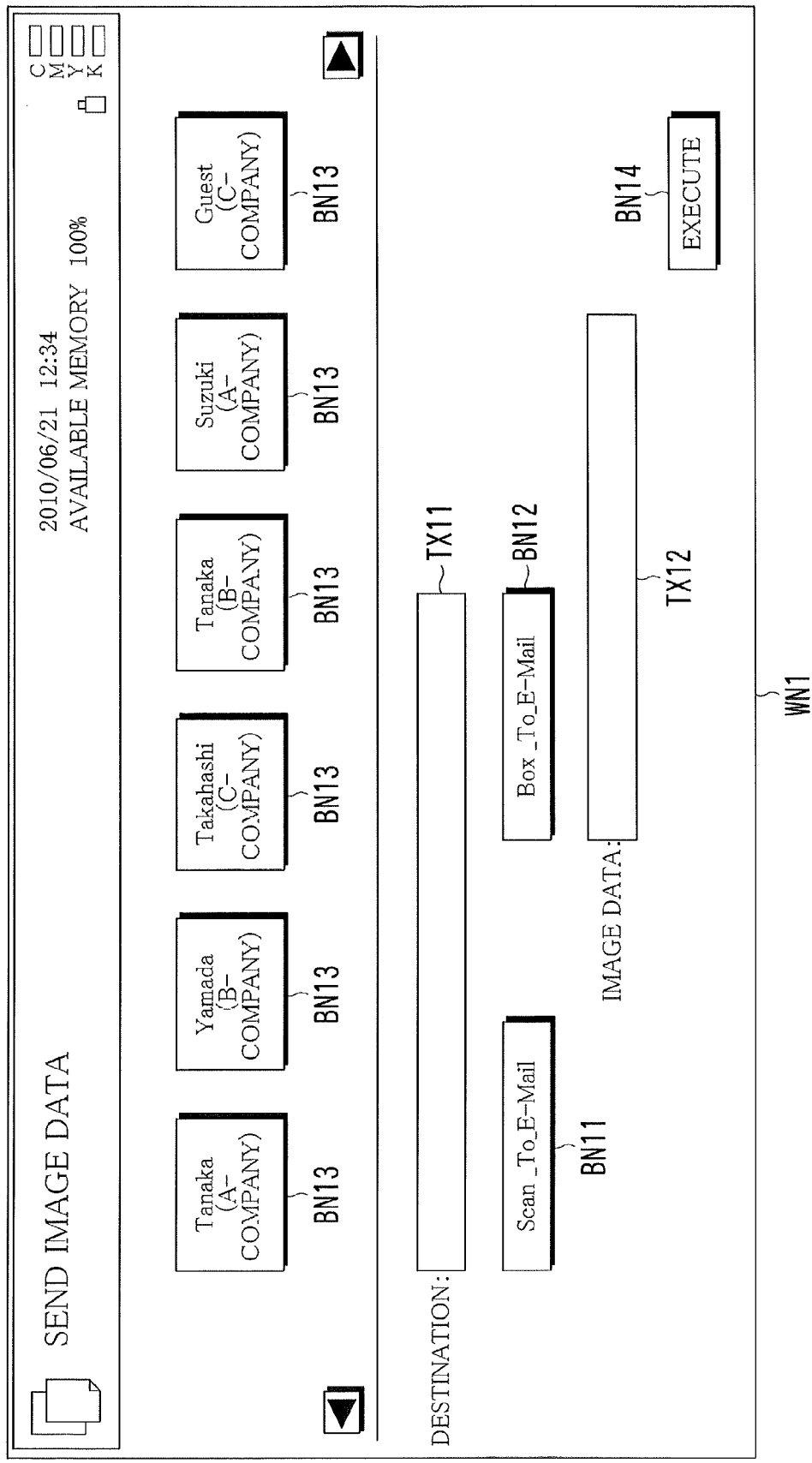
FIG. 11 is a diagram showing an example a transmission command screen.
Figure 12:
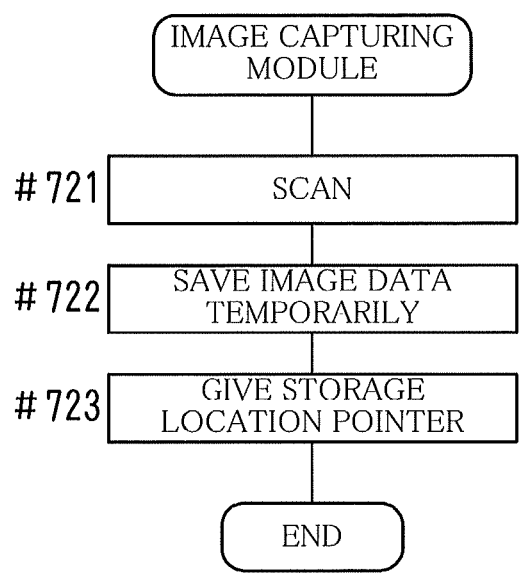
FIG. 12 is a flowchart depicting an example of the flow of processing based on an image capturing module.
Figure 13:
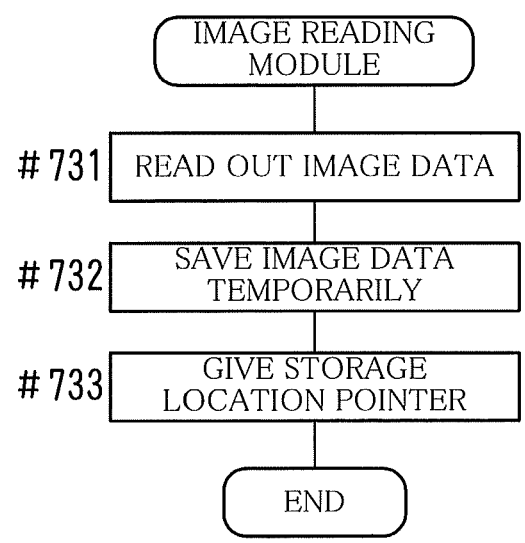
FIG. 13 is a flowchart depicting an example of the flow of processing based on an image reading module.
Figure 14:
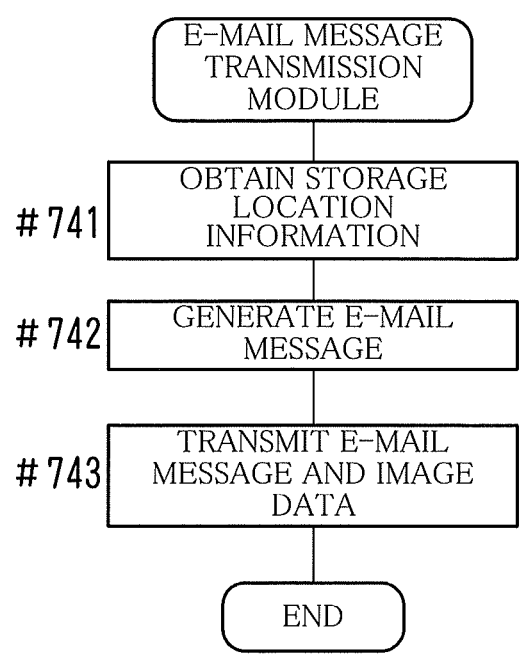
FIG. 14 is a flowchart depicting an example of the flow of processing based on an e-mail message transmission module.
Figure 15:
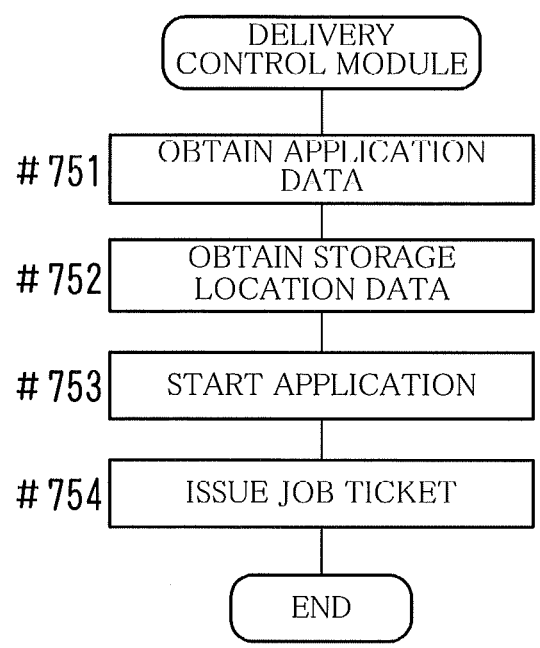
FIG. 15 is a flowchart depicting an example of the flow of processing based on a delivery control module.
Figure 16:
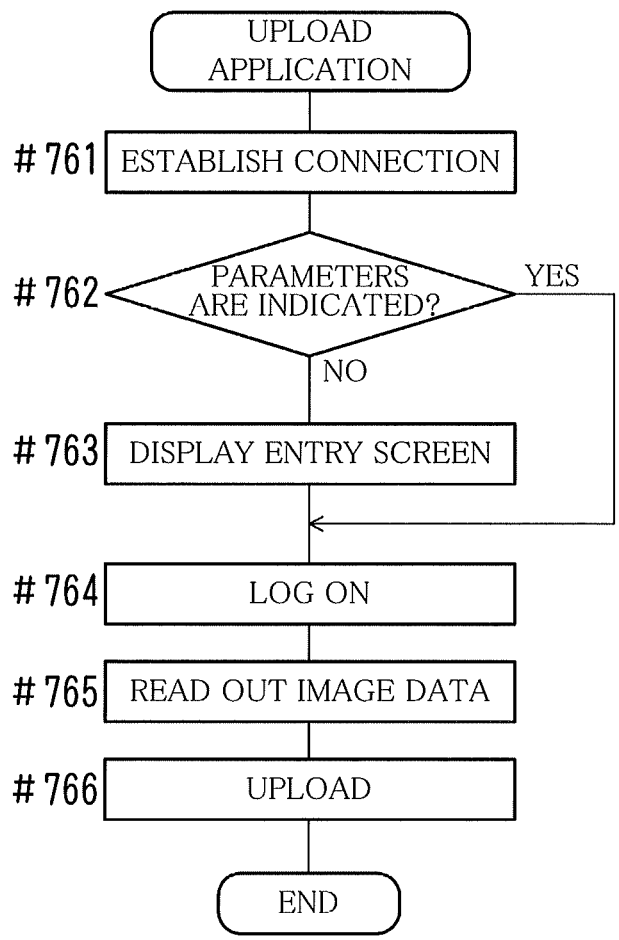
FIG. 16 is a flowchart depicting an example of the flow of processing based on an upload application.

FIG. 7 is a diagram showing an example of setting data 81; FIG. 8 is a flowchart depicting an example of the flow of the overall processing performed by the image forming apparatus 1; FIG. 9 is a flowchart depicting an example of the flow of processing based on the command receiving module 121; FIG. 10 is a flowchart depicting an example of the flow of processing based on the destination management module 103; FIG. 11 is a diagram showing an example a transmission command screen WN1; FIG. 12 is a flowchart depicting an example of the flow of processing based on the image capturing module 122; FIG. 13 is a flowchart depicting an example of the flow of processing based on the image reading module 123; FIG. 14 is a flowchart depicting an example of the flow of processing based on the e-mail message transmission module 124; FIG. 15 is a flowchart depicting an example of the flow of processing based on the delivery control module 125; FIG. 16 is a flowchart depicting an example of the flow of processing based on the upload application 105; and FIG. 17 is a diagram showing an example of an entry screen WN2.

Hereinafter, the functions of the individual portions shown in FIGS. 4-6 are described with reference to the flowchart of FIG. 8 and other drawings.

As shown in FIG. 7, the application database 303 stores a plurality of sets of setting data 81 therein. One set of setting data 81 is provided for one combination of an upload application 105 and a user thereof. Accordingly, when N users use the upload application 105A, the application database 303 stores, therein, N sets of setting data 81 for the upload application 105A.

The setting data 81 indicates a "set code" which is to distinguish the setting data 81 concerned from other sets of setting data 81.

The setting data 81 indicates a "registered name" which is to make it easy for human being to identify the setting data 81. As described later, the registered name is displayed on a touch-sensitive panel display of the operating panel 10i. The registered name is expressed, for example, in the form of combination of a name of the user related to the setting data 81 and a name of a document management service provider of the upload application 105 related to the setting data 81.

The setting data 81 also indicates a "host name" which is an identifier, on the Internet, of the document server 6S to which the upload application 105 is to upload data. The host name is expressed, for example, in the form of combination of a server name and a domain name. Alternatively, the host name may be expressed in the form of IP address.

The setting data 81 also indicates a "file path". The file path is the path name of a directory, in the document server 6S, for storing data on a file possessed by the corresponding user.

The setting data 81 also indicates a "user code" which is an identifier, in the document server 6S, of an account of the corresponding user. As described later, image data is stored into a storage area (folder, for example), of the document server 6S, corresponding to a user code designated by the user. Therefore, it may be said that the user code is used also as a destination of the image data.

The setting data 81 also indicates a "password" which is a password used for the corresponding user to log onto the document server 6S.

The setting data 81 further indicates an "application path" which is the path name, in the image forming apparatus 1, of a directory where the upload application 105 is stored.

The application database 303 also prepares, in advance, setting data 81 for a guest user. An example of such setting data 81 is shown in FIG. 7 as setting data 81 having a set code of "006". Note that the setting data 81 for guest user does not indicate information on file path, user code, and password. Such information is entered by a user when the application is started.

Referring to FIG. 8, when a user enters a predetermined command, the image forming apparatus 1 starts the e-mail message transmission application 101 to execute the individual modules according to the procedural steps shown in FIG. 8.

The image forming apparatus 1 executes the command receiving module 121 (Step #11 of FIG. 8). This implements the functions of the button data obtaining portion 201 through the job ticket issuing portion 203 shown in FIG. 4. The image forming apparatus 1 then starts the destination management module 103 to execute the same (Step #12). This implements the functions of the button data giving portion 301 through the application database 303. Descriptions are provided below, with reference to FIGS. 9 and 10, on the processing performed by the button data obtaining portion 201 through the job ticket issuing portion 203 and the processing performed by the button data giving portion 301 through the application database 303.

The button data obtaining portion 201 requests, from the button data giving portion 301, data on buttons to be laid out in the transmission command screen WN1 described later, and obtains such data (Step #701 of FIG. 9).

In response to the request (Yes in Step #711 of FIG. 10), the button data giving portion 301 extracts data on set code and registered name from the setting data 81 (see FIG. 7) stored in the application database 303, and gives the extracted data to the button data obtaining portion 201 as button data 85 (Step #712). If the application database 303 stores therein a plurality of sets of setting data 81, then the button data giving portion 301 extracts, from each set of setting data 81, data on set code and registered name, and gives the extracted data to the button data obtaining portion 201 as the button data 85.

The transmission configuration screen display processing portion 202 displays, on the touch-sensitive panel display of the operating panel 10i, the transmission command screen WN1 as that shown in FIG. 11 based on the received button data 85 (Step #702).

The transmission command screen WN1 has an option button BN11 to designate the Scan_To_E-Mail service, an option button BN12 to designate the Box_To_E-Mail service, a text box TX11 into which a destination e-mail address is entered, and a text box TX12 into which a path name of image data is entered.

The user enters, in the text box TX11, a destination e-mail address to which image data is to be sent. In order to send the image data through the Scan_To_E-Mail service, the user places paper on which an image has been depicted in the scanner unit 10 and presses the option button BN11. Alternatively, in order to send the image data through the Box_To_E-Mail service, the user enters a path name of the image data (identifier of a box where the image data to be sent is saved and a file name of the image data) in the text box TX12 and presses the option button BN12.

The transmission command screen WN1 also has option buttons BN13 corresponding to the individual sets of button data 85. Each of the option buttons BN13 is given a registered name indicated in the corresponding button data 85. Suppose that, for example, the user intends to upload image data, which is to be sent through the Scan_To_E-Mail service or the Box_To_E-Mail service, to the document server 6S by using the document management service. In such a case, the user selects, from among the option buttons BN13, one option button BN13 indicating his/her name and a name of a provider of the document management service to be used. Thereby, a set code corresponding to the pressed option button BN13 is selected.

When finishing selecting and entering necessary matters as discussed above, the user presses an execute button BN14. Alternatively, the user may press a start key (start button) of the key entry portion.

In response to the user's operation, the job ticket issuing portion 203 receives what has been selected or entered on the transmission command screen WN1. When the option button BN11 is selected, the job ticket issuing portion 203 issues a job ticket 84SE for Scan_To_E-Mail. When the option button BN12 is selected, the job ticket issuing portion 203 issues a job ticket 84BE for Box_To_E-Mail (Step #703 of FIG. 9).

The "job ticket" is data in which the job processing steps and the job conditions (for example, a destination e-mail address of image data) are described. The steps for the job are performed based on the job ticket.

In the meantime, the processing of Step #714 of FIG. 10 is executed later in response to a request from the application data obtaining portion 251.

The transmission command screen WN1 may be configured in such a manner that a user is allowed to enter scanning conditions such as image reading resolution and image data format. In such a case, it is possible to generate a job ticket 84SE indicating the entered conditions and to execute the image capturing module 122 described later in accordance with the entered conditions.

Referring back to FIG. 8, when the Scan_To_E-Mail service is selected on the transmission command screen WN1 (Yes in Step #13), the image forming apparatus 1 executes the image capturing module 122 (Step #14). Thereby, the functions of the scan control portion 221 through the storage location informing portion 223 shown in FIG. 5 are implemented. Descriptions are provided below, with reference to FIG. 12, on the processing performed by the scan control portion 221 through the storage location informing portion 223.

The scan control portion 221 controls the scanner unit 10*f* to scan an image on the paper placed (Step #721 of FIG. 12). Thereby, image data of the image on the paper is obtained. Hereinafter, the obtained image data is referred to as "image data 82SG".

The image data storage control portion 222 stores the image data 82SG into an available region of the image memory 10*c* (Step #722).

The storage location informing portion 223 gives a storage location pointer 83SE to the storage location information obtaining portion 241 or the storage location information obtaining portion 252 (see FIG. 4) in response to a request made therefrom (Step #723). The storage location pointer 83SE is data indicating a position (address) of the region into which the image data 82SG has been stored. The request timing is described later. Alternatively, instead of giving the storage location pointer 83SE in response to each request, the following arrangement is possible. The storage location pointer 83SE is stored in advance in a region corresponding to a specific address of the work memory 10*b*. Then, if necessary, the individual modules refer to the storage location pointer 83SE based on the specific address.

On the other hand, when the Box_To_E-Mail service is selected on the transmission command screen WN1 (No in Step #13 of FIG. 8), the image forming apparatus 1 starts the image reading module 123 to execute the same as shown in FIG. 13. Thereby, the functions of the image data reading portion 231 through the storage location informing portion 233 shown in FIG. 5 are implemented (Step #15).

The image data reading portion 231 reads out, from a box, image data identified by the path name entered in the text box TX12 of the transmission command screen WN1 (Step #731 of FIG. 13). Hereinafter, the image data thus read out is referred to as "image data 82BG".

The image data storage control portion 222 stores the image data 82BG into an available region of the image memory 10*c* (Step #732).

The storage location informing portion 233 gives a storage location pointer 83BE to the storage location information obtaining portion 241 or the storage location information obtaining portion 252 (see FIG. 4) in response to a request made therefrom (Step #733). The storage location pointer 83BE is data indicating a position (address) of the region into which the image data 82BG has been stored. The request timing is described later. As with the case of the storage location pointer 83SE, instead of giving the storage location pointer 83BE in response to each request, the following arrangement is possible. The storage location pointer 83BE is stored in advance in a region corresponding to a specific address of the work memory 10*b*. Then, if necessary, the individual modules refer to the storage location pointer 83BE based on the specific address.

When the image data 82SG or the image data 82BG is stored into the image memory 10*c*, the image forming apparatus 1 executes the e-mail message transmission module 124 (Step #16 of FIG. 8). Thereby, the functions of the storage location information obtaining portion 241 through the e-mail message transmission control portion 243 shown in FIG. 5 are implemented. Descriptions are provided below, with reference to FIG. 14, on processing by the storage location information obtaining portion 241 through the e-mail message transmission control portion 243.

The storage location information obtaining portion 241 requests, from the storage location informing portion 223, the storage location pointer 83SE and obtains the same (Step #741 of FIG. 14). Alternatively, the storage location information obtaining portion 241 requests, from the storage location informing portion 233, the storage location pointer 83BE and obtains the same (Step #741 of FIG. 14). The e-mail message generating portion 242 generates an e-mail message (Step #742). At this time, the body and title of the e-mail message may be inputted by copying a template prepared in advance, or, alternatively, may be inputted by a user.

The e-mail message transmission control portion 243 then reads out the image data 82SG or image data 82BG based on the address indicated in the storage location pointer 83SE or storage location pointer 83BE (such an address is hereinafter referred to as a "storage location address") stored in the image memory 10*c*, attaches the image data 82SG or image data 82BG thus read out to the e-mail message, and controls the NIC 10*h* to transmit the e-mail message to the destination e-mail address entered in the text box TX11 (Step #743).

Through the foregoing processing steps, the Scan_To_E-Mail job or the Box_To_E-Mail job is completed.

If any one of the option buttons BN13 is pressed on the transmission command screen WN1 (Yes in Step #17 of FIG. 8), then the image forming apparatus 1 executes the delivery control module 125 (Step #18). Thereby, the functions of the application data obtaining portion 251 through the job ticket issuing portion 254 shown in FIG. 4 are implemented. The following is a description of the processing by the application data obtaining portion 251 through the job ticket issuing portion 254 with reference to FIG. 15.

The application data obtaining portion 251 requests, from the destination management module 103, data on application, and obtains the same (Step #751 of FIG. 15). In response to the request, the application data giving portion 302 extracts data on host name, file path, user code, password, and application path from the setting data 81 (refer to FIG. 7) indicating the set code selected on the transmission command screen WN1 (refer to FIG. 11), and gives the extracted data to the application data obtaining portion 251 as application data 86 (Yes in Step #713 of FIG. 10, and Step #714).

The storage location information obtaining portion 252 requests the storage location pointer 83SE from the storage location informing portion 223, and obtains the same (Step #752). Alternatively, the storage location information obtaining portion 252 requests the storage location pointer 83BE from the storage location informing portion 233, and obtains the same (Step #752).

The application starting portion 253 launches the upload application 105 stored in the application path indicated in the application data 86 (Step #753).

The job ticket issuing portion 254 issues a job ticket 84UL for a job of uploading image data to the document server 6S. Such a job is hereinafter referred to as an "upload job".

The job ticket 84UL indicates a user code, password, file path, and host name that are shown in the application data 86, and also indicates a location storing address shown in the storage location pointer 83SE or storage location pointer 83BE obtained by the storage location information obtaining portion 252. As discussed above, however, the setting data 81 for guest user does not indicate information such as a user code, password, and file path. Thus, the job ticket 84UL does not indicate the information.

When the upload application 105 starts, the connection establishment processing portion 501 through the image data transmission control portion 504 shown in FIG. 6 perform processing based on the job ticket 84UL according to the procedural steps shown in FIG. 16.

The connection establishment processing portion 501 accesses the document server 6S based on the host name shown in the job ticket 84UL, and establishes a connection between the image forming apparatus 1 and the document server 6S (Step #761 of FIG. 16).

If the job ticket 84UL does not indicate at least one of the user code and the password (No in Step #762), then the entry screen display processing portion 502 displays the entry screen WN2 into which a user code and a password are entered as shown in FIG. 17 on the touch-sensitive panel display of the operating panel 10i (Step #763). The user enters his/her user code and password on the entry screen WN2. A file path is required in some cases depending on the document management service. In such a case, when the job ticket 84UL indicates no file path, a file path entry screen is displayed in Step #763 to prompt the user to enter a file path on the file path entry screen.

The logon processing portion 503 logs onto the document server 6S to which the image forming apparatus 1 is connected by using the user code and password that are indicated in the job ticket 84UL or entered into the entry screen WN2 (Step #764).

The image data transmission control portion 504 reads out the image data 82SG or image data 82BG based on a storage location address of the image memory 10c indicated in the job ticket 84UL, and controls the NIC 10h to transmit the image data 82SG or image data 82BG thus read out to the document server 6S connected to the image forming apparatus 1 (Step #766). Arrangement is so made that the image data 82SG or image data 82BG are transmitted after the image data transmission control portion 504 accesses, if necessary, the file path indicated in the job ticket 84UL or entered by the user.

Upon the receipt of the image data 82SG or image data 82BG, the document server 6S stores the same into a storage area corresponding to the user code that was entered for the log-on operation. In this way, the upload job is completed.

When a plurality of the option buttons BN13 are pressed on the transmission command screen WN1 (refer to FIG. 11), the image forming apparatus 1 starts the upload applications 105 corresponding to the pressed option buttons BN13 to execute upload jobs in series or in parallel.

This embodiment simplifies operation to send image data to a plurality of destinations by using applications different from each other, i.e., by using separate methods.

Figure 18:
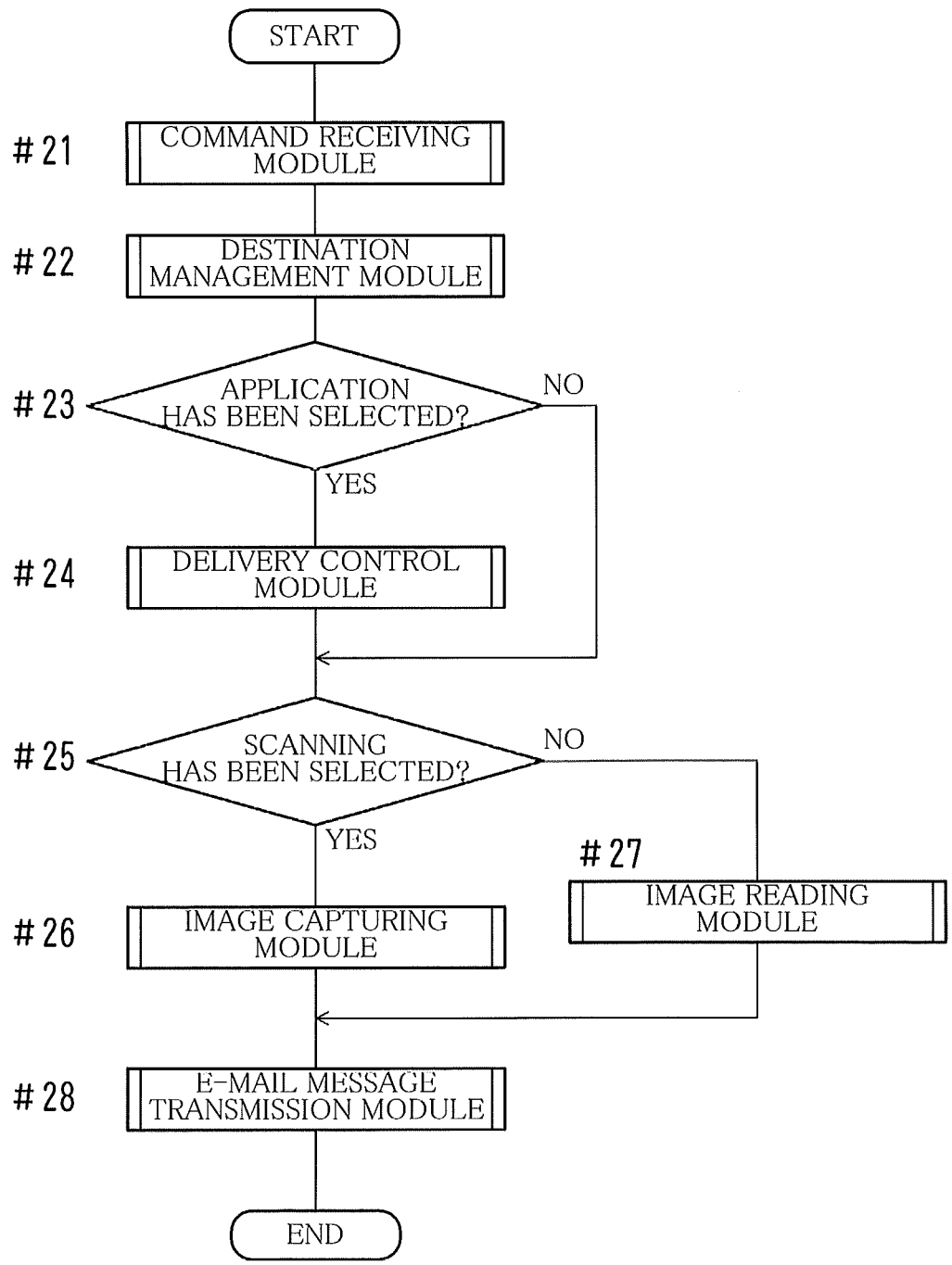
FIG. 18 is a flowchart depicting a modified example of the flow of the overall processing performed by an image forming apparatus.
Figure 19:
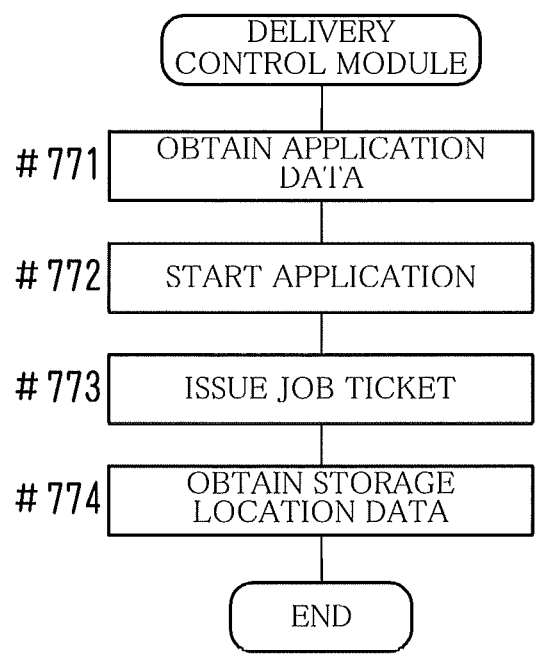
FIG. 19 is a flowchart depicting a modified example of the flow of processing based on a delivery control module.
Figure 20:
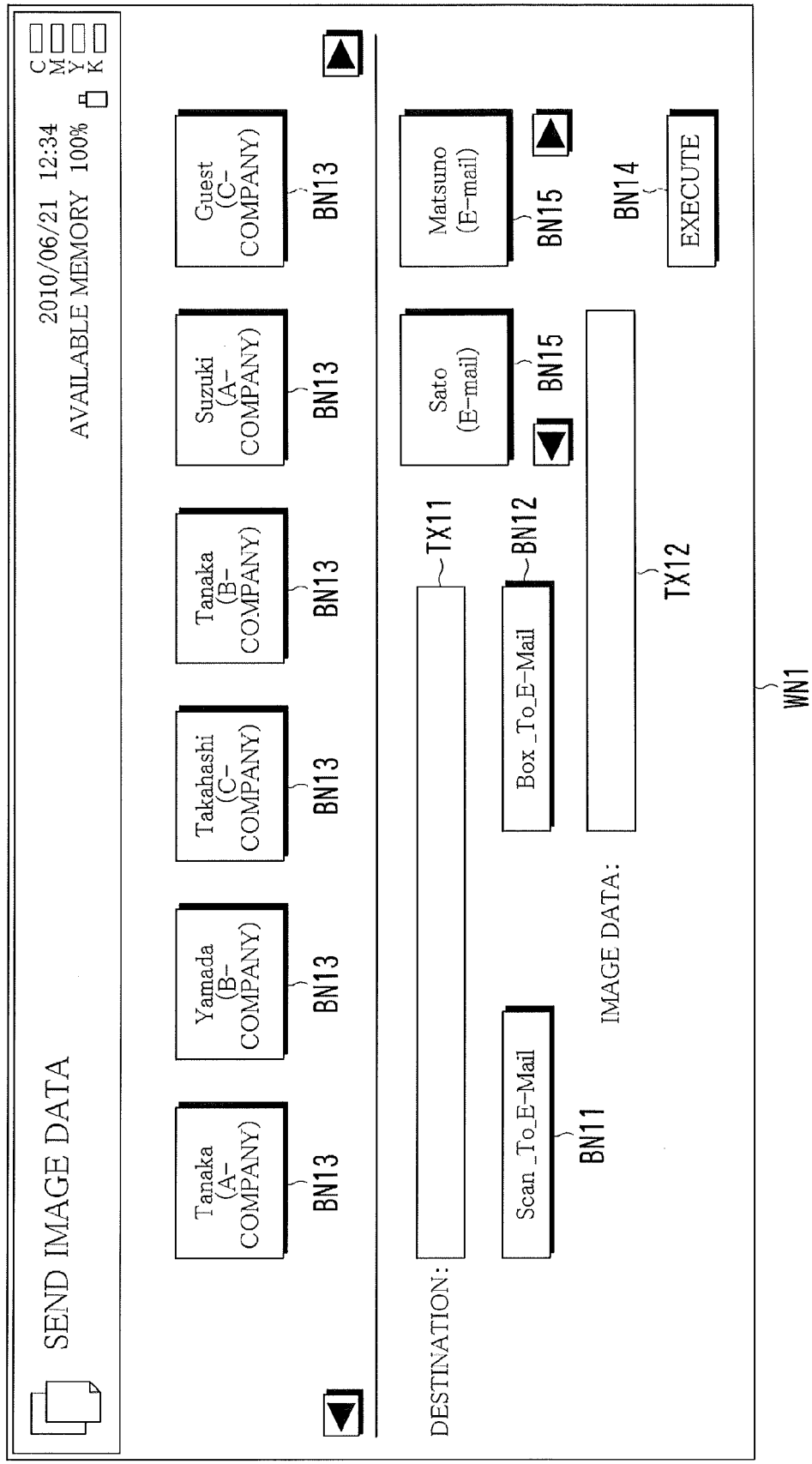
FIG. 20 is a diagram showing a modified example of a transmission command screen.

FIG. 18 is a flowchart depicting a modified example of the flow of the overall processing performed by the image forming apparatus 1; FIG. 19 is a flowchart depicting a modified example of the flow of processing based on the delivery control module 125; FIG. 20 is a diagram showing a modified example of the transmission command screen WN1; FIG. 21 is a diagram showing an example of a list of e-mail addresses and registered names; and FIG. 22 is a diagram showing an example of an application database corresponding to the upload application 105A.

In the foregoing embodiment, when a user is required to enter a user code and a password for the document management service, the image forming apparatus 1 displays the entry screen WN2 (see FIG. 17) after executing a Scan_To_E-Mail job or a Box_To_E-Mail job. Instead of this, however, the image forming apparatus 1 may display the entry screen WN2 before executing a Scan_To_E-Mail job or a Box_To_E-Mail job.

In order to do so, the image forming apparatus 1 preferably executes the individual programs according to the procedural steps as shown in FIG. 18. To be specific, the image forming apparatus 1 first initiates execution of the command receiving module 121 and the destination management module 103 (Step #21 and Step #22 of FIG. 18). The flows of the processing based on both the modules are described earlier with reference to FIGS. 9 and 10.

If any one of the option buttons BN13 is pressed on the transmission command screen WN1 (refer to FIG. 11) (Yes in Step #23), then the image forming apparatus 1 initiates execution of the delivery control module 125 (Step #24) prior to execution of the image capturing module 122 and execution of the image reading module 123.

The application data obtaining portion 251 through the job ticket issuing portion 254 (see FIG. 4) perform processing according to the procedural steps shown in FIG. 19 instead of the procedural steps shown in FIG. 15.

To be specific, when the application data obtaining portion 251 obtains the application data 86 (Step #771 of FIG. 19), the application starting portion 253 starts the upload application 105 based on an application path indicated in the application data 86 (Step #772), and the job ticket issuing portion 254 issues a job ticket 84UL (Step #773). In the example of FIG. 15, the storage location pointer 83SE or the storage location pointer 83BE is obtained (Step #752) at the start of the upload application 105. In the example of FIG. 19, neither the storage location pointer 83SE nor the storage location pointer 83BE can be obtained because a Scan_To_E-Mail job or a Box_To_E-Mail job has not yet been initiated. For this reason, the job ticket 84UL indicates neither the storage location pointer 83SE nor the storage location pointer 83BE.

Upon the start of the upload application 105, the connection establishment processing portion 501 and the image data transmission control portion 504 (see FIG. 6) perform processing according to the procedural steps shown in FIG. 16. Note, however, that after the processing of Step #764 is finished, the connection establishment processing portion 501 and the image data transmission control portion 504 wait until the storage location pointer 83SE or the storage location pointer 83BE is obtained. After obtaining the same, the connection establishment processing portion 501 and the image data transmission control portion 504 perform the processing from Step #765 through Step #766.

The image forming apparatus 1 stops the delivery control module 125 temporarily, and executes the image capturing module 122 or the image reading module 123 depending on the selection of the option button BN11 or the option button BN12 (Step #25 through Step #27). In this way, the image data 82SG or the image data 82BG is obtained.

The image forming apparatus 1 then executes the e-mail message transmission module 124, so that the image data 82SG or the image data 82BG is attached to an e-mail message and the resultant is transmitted (Step #28). The storage location information obtaining portion 252 obtains the storage location pointer 83SE or the storage location pointer 83BE, and writes the same into the job ticket 84UL (Step #774 of FIG. 19). The processing based on the upload application 105 is resumed from Step #765 of FIG. 16.

In this embodiment, image data is outputted by attaching the image data to an e-mail message and transmitting the resultant, or, alternatively, by uploading the image data to the document server 6S. Another configuration is possible in which image data is sent to another image forming apparatus based on selection by a user, and the image forming apparatus is caused to perform print processing of an image corresponding to the image data received. Alternatively, the image forming apparatus 1 itself may print an image based on the image data.

In this embodiment, destination addresses for the Scan_To_E-Mail service and the Box_To_E-Mail service are entered into the text box TX11 (refer to FIG. 11). Instead of this, however, the arrangement shown in FIG. 20 is also possible. To be specific, an option button BN15 for each e-mail address is provided in the transmission command screen WN1. Then, a user presses a desired option button BN15 to select an e-mail address used as the destination of image data. In this arrangement, a list of e-mail addresses is prepared as shown in FIG. 21, and the option buttons BN15 are placed preferably based on the list.

In this embodiment, a plurality of sets of setting data 81 for all of the upload applications 105 is stored in one application database 303 as shown in FIG. 7. Instead of this, however, it is possible to prepare a database for each of the upload applications 105, and to store therein classified sets of setting data 81. For example, as shown in FIG. 22, a plurality of sets of setting data 81 for the upload application 105A is stored in a database corresponding to the upload application 105A.

In this embodiment, image data to be transmitted is temporarily stored into the image memory 10c. Instead of the image memory 10c, another storage medium may be used to store image data to be transmitted. A location at which image data is stored may be indicated in the form of absolute address, logical address, or path.

A part or the whole of the functions shown in FIGS. 4-6 may be configured by hardware modules.

In this embodiment, image data is transmitted by using the functions of the image forming apparatus 1. The functions of the image forming apparatus 1 may be used to transmit voice data and other types of data. In such a case, voice data is saved to a box, and a user specifies voice data as the transmission target.

It is to be understood that the configurations of the image forming apparatus 1, the constituent elements thereof, the content and order of the processing, the configuration of data, and the like can be appropriately modified without departing from the spirit of the present invention.

While example embodiments of the present invention have been shown and described, it will be understood that the present invention is not limited thereto, and that various changes and modifications may be made by those skilled in the art without departing from the scope of the invention as set forth in the appended claims and their equivalents.

What is claimed is:

1. An image data transmission apparatus configured to execute a plurality of transmission tools sequentially or simultaneously, each of the transmission tools being an application to send data, the image data transmission apparatus comprising:
    an option storing portion configured to store a plurality of options in each of which a destination to which transmission target image data is to be sent is associated with a tool identifier for identifying one of the transmission tools to be used to send the transmission target image data associated;
    a receiving portion configured to, when a user selects two or more options from among the plurality of options, receive the destination corresponding to each of the options selected and the tool identifier corresponding to each of the options selected;
    a writing portion configured to store the transmission target image data into an image data storage portion; and
    a transmission control portion configured to, after the receiving portion receives the destination and the tool identifier, perform, for each of the options selected, a process for sending the transmission target image data stored in the image data storage portion to the destination received by using the transmission tool corresponding to said tool identifier received.

2. The image data transmission apparatus according to claim 1, wherein
    the transmission tools include any one or more of upload tools for uploading data to a server,
    the image data transmission apparatus includes an authentication information storage portion configured to store, for each of said any one or more of the upload tools, authentication information based on which authentication is performed, and
    when said any one or more of the upload tools is used to perform a process for sending the transmission target image data, the transmission control portion performs, prior to the process for sending, a process for performing the authentication by using the authentication information of said any one or more of the upload tools.

3. The image data transmission apparatus according to claim 1, wherein
    the transmission tools include any one or more of upload tools for uploading data to a server,
    when said any one or more of the upload tools is used to perform a process for sending the transmission target image data, the transmission control portion performs, prior to the process for sending, a process for performing authentication by using authentication information entered by the user, and
    the writing portion stores the transmission target image data into the image data storage portion after the authentication information is entered.

4. The image data transmission apparatus according to claim 1, wherein
    the transmission tools include an e-mail tool for obtaining image data, attaching the image data to an e-mail message, and transmitting the resulting e-mail message,
    the receiving portion receives, as the transmission tool, the e-mail tool, and
    the writing portion stores, as the transmission target image data, image data obtained by using the e-mail tool into the image data storage portion.

5. The image data transmission apparatus according to claim 4, wherein the e-mail tool is to obtain image data by causing a scanner to read an image, attach the image data to an e-mail message, and transmit the resulting e-mail message.

6. The image data transmission apparatus according to claim 4, wherein the e-mail tool is to obtain image data by reading out image data from a saving means, attach the image data to an e-mail message, and transmit the resulting e-mail message.

7. The image data transmission apparatus according to claim 1, wherein
the plurality of options correspond to a plurality of different upload tools of the plurality of transmission tools, and
the transmission control portion performs processing sequentially or simultaneously of sending the transmission target image data to the destinations received by the receiving portion by using the plurality of upload tools corresponding to the options selected.

8. The image data transmission apparatus according to claim 1, wherein the transmission control portion sends the transmission target image data to, as the destination, another image forming apparatus.

9. A method for transmitting image data by causing a transmission apparatus to execute a plurality of transmission tools sequentially or simultaneously, each of the transmission tools being an application to send data, the method comprising:
storing, in an option storing portion, a plurality of options in each of which a destination to which transmission target image data is to be sent is associated with a tool identifier for identifying one of the transmission tools to be used to send the transmission target image data associated;
causing the transmission apparatus to, when a user selects two or more options from among the plurality of options, receive the destination corresponding to each of the options selected and the tool identifier corresponding to each of the options selected;
causing the transmission apparatus to perform a write process for storing the transmission target image data into an image data storage portion; and
causing the transmission apparatus to, after the destination and the tool identifier are received, perform, for each of the options selected, a transmission process for sending the transmission target image data stored in the image data storage portion to the destination received by using the transmission tool corresponding to said tool identifier received.

10. The method according to claim 9, wherein
the transmission tools include any one or more of upload tools for uploading data to a server,
the method includes storing, in an authentication information storage portion, for each of said any one or more of the upload tools, authentication information based on which authentication is performed, and
when said any one or more of the upload tools is used to perform the transmission process, the transmission device performs, prior to the transmission process, a process for performing the authentication by using the authentication information of said any one or more of the upload tools.

11. The method according to claim 9, wherein
the transmission tools include any one or more of upload tools for uploading data to a server,
when said any one or more of the upload tools is used to perform the transmission process, the transmission device performs, prior to the transmission process, a process for performing authentication by using authentication information entered by the user, and
the write process is performed after the authentication information is entered.

12. The method according to claim 9, wherein
the transmission tools include an e-mail tool for obtaining image data, attaching the image data to an e-mail message, and transmitting the resulting e-mail message, and
when the e-mail tool is received as the transmission tool, the transmission apparatus performs the write process by using, as the transmission target image data, image data obtained by the e-mail tool.

13. The method according to claim 12, wherein the e-mail tool is to obtain image data by causing a scanner to read an image, attach the image data to an e-mail message, and transmit the resulting e-mail message.

14. The method according to claim 12, wherein the e-mail tool is to obtain image data by reading out image data from a saving means, attach the image data to an e-mail message, and transmit the resulting e-mail message.

15. The method according to claim 9, wherein
the plurality of options correspond to a plurality of different upload tools of the plurality of transmission tools, and
a process of sending the transmission target image data to the destinations received by the receiving portion by using the plurality of upload tools corresponding to the options selected is performed sequentially or simultaneously.

16. The method according to claim 9, wherein the transmission target image data is sent to, as the destination, another image forming apparatus.

17. A non-transitory computer-readable storage medium storing thereon a computer program used in a computer configured to execute a plurality of transmission tools sequentially or simultaneously, each of the transmission tools being an application to send data, and configured also to access an option storing portion for storing a plurality of options in each of which a destination to which transmission target image data is to be sent is associated with a tool identifier for identifying one of the transmission tools to be used to send the transmission target image data associated, the computer program causing the computer to perform processes comprising:
a receiving process for receiving, when a user selects two or more options from among the plurality of options, the destination corresponding to each of the options selected and the tool identifier corresponding to each of the options selected;
a write process for storing the transmission target image data into an image data storage portion; and
after the destination and the tool identifier are received, for each of the options selected, a transmission process for sending the transmission target image data stored in the image data storage portion to the destination received by using the transmission tool corresponding to said tool identifier received.

18. The non-transitory computer-readable storage medium according to claim 17, wherein
the transmission tools include any one or more of upload tools for uploading data to a server,
the computer is configured to access an authentication information storage portion for storing, for each of said any one or more of the upload tools, authentication information based on which authentication is performed, and
when the computer is caused to perform the transmission process by using said any one or more of the upload tools, prior to the transmission process, the computer is caused to perform a process for performing the authentication by using the authentication information of said any one or more of the upload tools.

19. The non-transitory computer-readable storage medium according to claim 17, wherein the transmission tools include any one or more of upload tools for uploading data to a server, when the computer is caused to perform the transmission process by using said any one or more of the upload tools, prior to the transmission process, the computer is caused to perform a process for performing authentication by using authentication information entered by the user, and the computer is caused to perform the write process after the authentication information is entered.

20. The non-transitory computer-readable storage medium according to claim 17, wherein the transmission tools include an e-mail tool for obtaining image data, attaching the image data to an e-mail message, and transmitting the resulting e-mail message, and when the e-mail tool is received as the transmission tool, the computer is caused to perform the write process by using, as the transmission target image data, image data obtained by the e-mail tool.

21. The non-transitory computer-readable storage medium according to claim 20, wherein the e-mail tool is to obtain image data by causing a scanner to read an image, attach the image data to an e-mail message, and transmit the resulting e-mail message.

22. The non-transitory computer-readable storage medium according to claim 20, wherein the e-mail tool is to obtain image data by reading out image data from a saving means, attach the image data to an e-mail message, and transmit the resulting e-mail message.

23. The non-transitory computer-readable storage medium according to claim 17, wherein the plurality of options correspond to a plurality of different upload tools of the plurality of transmission tools, and a process of sending the transmission target image data to the destinations received by the receiving portion by using the plurality of upload tools corresponding to the options selected is performed sequentially or simultaneously.

24. The non-transitory computer-readable storage medium according to claim 17, wherein the transmission target image data is sent to, as the destination, another image forming apparatus.

25. An image data transmission apparatus configured to execute a plurality of transmission tools sequentially or simultaneously, each of the transmission tools being an application to send data, the image data transmission apparatus comprising:

a selection screen display portion configured to display a screen on which a user makes settings for data transmission to a plurality of destinations and selects the transmission tools used for the data transmission to the plurality of destinations;

a destination obtaining portion configured to obtain the plurality of destinations;

a writing portion configured to store transmission target image data to be sent into an image data storage portion; and a transmission control portion configured to send the transmission target image data stored by the writing portion to each of the plurality of destinations obtained by the destination obtaining portion by using the transmission tool selected on the screen displayed by the selection screen display portion; wherein the screen displayed by the selection screen display portion includes a first region having a first button used for selecting a first transmission tool from among the plurality of transmission tools, and a second region having a second button used for selecting, from among the plurality of transmission tools, a second transmission tool different from the first transmission tool.

26. A method for transmitting image data by causing a transmission apparatus to execute a plurality of transmission tools sequentially or simultaneously, each of the transmission tools being an application to send data, the method comprising:

displaying a screen on which a user makes settings for data transmission to a plurality of destinations and selects the transmission tools used for the data transmission to the plurality of destinations;

obtaining the plurality of destinations;

storing transmission target image data to be sent into an image data storage portion; and sending the transmission target image data stored in the image data storage portion to each of the obtained plurality of destinations by using the transmission tool selected on the displayed screen; wherein the displayed screen includes a first region having a first button used for selecting a first transmission tool from among the plurality of transmission tools, and a second region having a second button used for selecting, from among the plurality of transmission tools, a second transmission tool different from the first transmission tool.

27. A non-transitory computer-readable storage medium storing thereon a computer program used in a computer configured to execute a plurality of transmission tools sequentially or simultaneously, each of the transmission tools being an application to send data, the computer program causing the computer to perform processes comprising:

displaying a screen on which a user makes settings for data transmission to a plurality of destinations and selects the transmission tools used for the data transmission to the plurality of destinations;

obtaining the plurality of destinations;

storing transmission target image data to be sent into an image data storage portion; and sending the transmission target image data stored in the image data storage portion to each of the obtained plurality of destinations by using the transmission tool selected on the displayed screen; wherein the displayed screen includes a first region having a first button used for selecting a first transmission tool from among the plurality of transmission tools, and a second region having a second button used for selecting, from among the plurality of transmission tools, a second transmission tool different from the first transmission tool.

* * * * *